United States Patent [19]

Egawa

[11] Patent Number: 4,872,178
[45] Date of Patent: Oct. 3, 1989

[54] OUTPUT VOLTAGE DETECTING DEVICE IN A LASER OSCILLATOR

[75] Inventor: Akira Egawa, Minamitsuru, Japan
[73] Assignee: Fanuc Ltd, Minamitsuru, Japan
[21] Appl. No.: 269,745
[22] PCT Filed: Feb. 19, 1988
[86] PCT No.: PCT/JP88/00182
§ 371 Date: Oct. 27, 1988
§ 102(e) Date: Oct. 27, 1988
[87] PCT Pub. No.: WO88/06809
PCT Pub. Date: Sep. 7, 1988

[30] Foreign Application Priority Data
Mar. 3, 1987 [JP] Japan ................... 62-48409

[51] Int. Cl.⁴ .......................................... H01S 3/097
[52] U.S. Cl. ......................................... 372/82; 372/81
[58] Field of Search ............................ 372/81, 82, 38

[56] References Cited
U.S. PATENT DOCUMENTS
4,748,634 5/1988 Hesterman ..................... 372/82

FOREIGN PATENT DOCUMENTS
0212080 9/1986 Japan ............................ 372/82

OTHER PUBLICATIONS
WO-A-8 806 810 (Fanuc), Claim 7; FIG. 4 (PCT/JP88/00182).

Primary Examiner—William L. Sikes
Assistant Examiner—Georgia Y. Epps
Attorney, Agent, or Firm—Staas & Halsey

[57] ABSTRACT

Disclosed herein is an output voltage detecting device in a laser oscillator for which a matching circuit is connected between a high frequency power supply unit and a laser tube. The matching circuit is provided with reactance elements (31, 33) to which a load is connected in parallel. A current transformer for detecting a current is coupled to a ground terminal of one of the reactance elements at the output side of the matching circuit, and a voltage applied to the laser tube is detected in accordance with the current detected by the current transformer.

6 Claims, 1 Drawing Sheet

OUTPUT VOLTAGE DETECTING DEVICE IN A LASER OSCILLATOR

BACKGROUND OF THE INVENTION

The present invention is directed to an output voltage detecting device in a laser oscillator, and more particularly to an output voltage detecting device in a laser oscillator which is operable at a low voltage and manufactured at an inexpensive cost.

A laser tube has an electrical impedance which varies depending upon an confined gas status in the interior of the laser tube. As a consequence, a voltage supplied to the laser tube varies. For example, in a laser oscillator having a current feedback loop with which a current is fedback to the laser tube, the variation in the electrical impedance of the laser tube causes the supply voltage to vary, since the current is being controlled to be a constant. If this condition is left as it stands, semiconductor elements, the laser tube or other elements which form an inverter in a high frequency power supply are damaged. Furthermore, the output voltage needs to be monitored to ascertain if the supply voltage is stable.

In view of the foregoing, it is conventional practice to detect the voltage supplied to the laser tube, and when the resultant voltage is above a reference voltage, an alarm is generated. When the detected voltage is above a danger-level voltage, the driving is stopped. In addition, it has been necessary to detect and monitor the output voltage in order to control the output voltage to a constant. Accordingly, it can be appreciated that in the laser oscillator, monitoring of the voltage supplied to the laser tube and measurement thereof are important measuring items. Conventionally, such measurements have been carried out using a transformer or voltage-division capacitors.

However, the transformer is required to have a considerably high voltage insulation resistivity. The transformer is further required to have a high frequency characteristic attendant to the high frequency power supply unit. For such reasons, the transformers which are extremely expensive have to be employed.

A method in which the voltage is divided by capacitors is involved with a problem such that a power supply line led to the laser tube cannot be isolated from a ground connection of a control apparatus, so that noise is liable to be introduced into a control circuit.

SUMMARY OF THE INVENTION

It is an object of the present invention to resolve the above-mentioned problems and to provide an output voltage detecting device in a laser oscillator, which is operable at a low voltage and inexpensive to manufacture.

In order to resolve the above-mentioned problems, the present invention provides an output voltage detecting device in a laser oscillator, including a matching circuit connected between a high frequency power supply unit and a laser tube, the matching circuit having reactance elements connected in parallel to a load of the matching circuit, the laser oscillator also comprising a current transformer for detecting a current flowing in a ground terminal of one of the reactance elements connected to an output terminal of the matching a voltage applied to the laser tube is detected on the basis of the current detected by the current transformer.

Since the current transformer is coupled to the ground terminal of the reactance element, the voltage induced in the current transformer is extremely low. In addition, the output voltage is given by the product of the current detected by the current transformer and the impedance of the parallel-connected reactance.

DESCRIPTION OF THE PREFERRED EMBODIMENT

Figure 1:
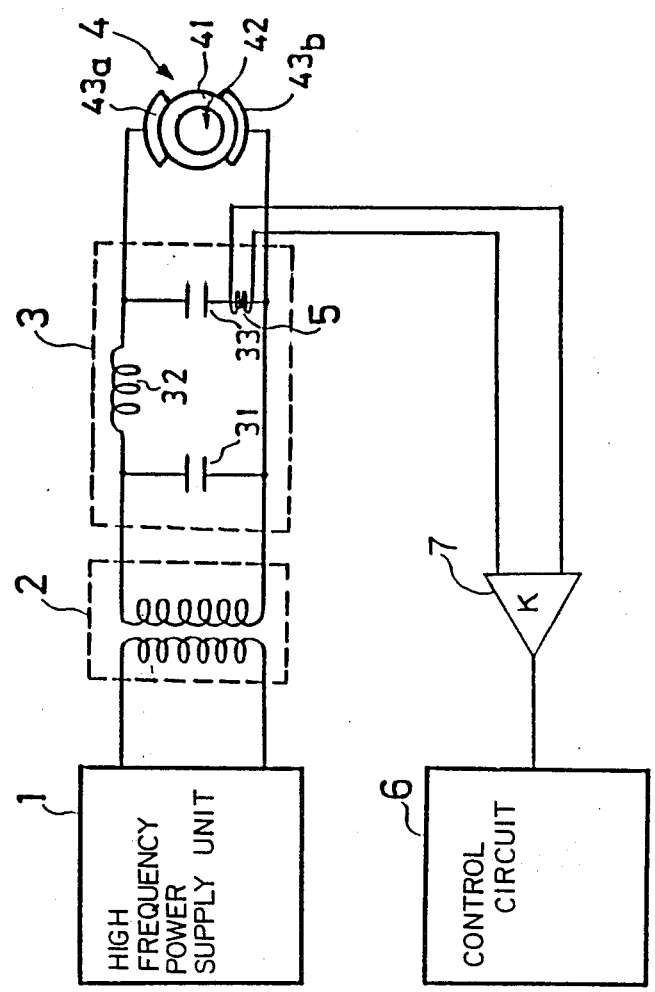
FIG. 1 is a block diagram showing one embodiment of the present invention.

One embodiment of the invention will be described with reference to a drawing.

FIG. 1 is a block diagram of one embodiment according to the present invention. In the figure, a high frequency power supply unit 1 supplies a high frequency voltage upon rectifying a current from a commercial power supply to provide a D.C. current and then converts it to the high frequency voltage using a high frequency inverter. A booster transformer 2 boosts the high frequency voltage supplied from the high frequency power supply unit to a required voltage. A matching circuit 3 performs an impedance matching between the transformer 2 and a laser tube, so that power fed from the high frequency power supply unit is effectively supplied to the laser tube. In this embodiment, a $\pi$-type matching circuit is employed. Capacitors 31 and 33 are parallel-connected reactances and an inductor 32 is a serially-connected reactance.

The laser tube 4 has a tube 41 formed with, for example, a silica glass. In the interior of the laser tube, a laser gas medium 42 is being circulated. Through electrodes 43a and 43b, a high frequency voltage is applied to the tube 41. A discharge takes place for the laser gas medium 42 confined within the laser tube 41 while applying a high frequency voltage, whereupon the laser light is oscillated and amplified. The direction of emitted laser light is perpendicular to the sheet of drawing.

A current transformer 5 is coupled to the ground side terminal of the parallel-connected capacitor 33 disposed in the output terminal. Accordingly, the voltage induced in the current transformer 5 is extremely low, and thus current transformers of low insulation voltage are available for use. Since a ground terminal of the current transformer 5 is isolated from the matching circuit 3, there is little possibility that noise is introduced into the current transformer 5.

An amplifier 7 is provided in which assuming that its amplification factor K is an impedance of a capacitor, the output of the amplifier is defined by a product of a current fed from the current transformer 5 and the impedance of the parallel-connected capacitor. A voltage of the high frequency power supply unit applied to the laser tube is thereby calculated. Alternatively, dispensing with the amplifier 7, the voltage supplied to the laser tube can be calculated in a control circuit 6 in such a manner that the current fed from the current transformer 5 is converted to a digital value with the use of a D/A converter and a product of the resultant value and the impedance of the capacitor 33 is obtained, where the impedance of the capacitor 33 has been stored in advance. The voltage thus obtained is compared with a predetermined reference voltage, and when it is above the reference voltage by a predetermined value, an alarm is generated. When the voltage obtained has reached or is above a dangerlevel voltage, the driving is topped. Furthermore, while monitoring the voltage obtained, it may automatically be controlled so as to be constant.

The control circuit 6 may be arranged to carry out positional control of a table of a laser processing machine, serving as a computerized numerical controller (CNC). In this case, an arithmetic processing of the impedance can be executed by a microprocessor provided within the computerized numerical controller (CNC).

Although the π-type matching circuit is exemplified for the matching circuit, other types of matching circuits are available if they have a parallel-connected impedance in their output terminals, where the current transformer can be used in the same fashion.

As described above, according to the present invention, voltage detection is performed on the basis of a current detected by the current transformer coupled to the ground side terminal of the parallel-connected reactance at the output terminal of the matching circuit. Therefore, the insulating voltage of the current transformer may be low, thereby allowing the use of an inexpensive current transformer. Further the voltage supplied to the laser tube can be measured with a simplified arrangement.

I claim:

1. An output voltage detecting device in a laser oscillator, including a matching circuit connected between a high frequency power supply unit and a laser tube, said matching circuit having reactance elements connected in parallel to a load of the matching circuit, said output voltage detecting device comprising:
   a current transformer, connected to the matching circuit and the laser tube, for detecting current flowing in a ground terminal of one of the reactance elements connected to an output terminal of the matching circuit, a voltage applied to the laser tube being detected on the basis of current detected by said current transformer.

2. An output voltage detecting device in a laser oscillator as recited in claim 1, wherein the reactance elements comprise capacitors.

3. An output voltage detecting device in a laser oscillator as recited in claim 1, wherein while converting current detected by said current transformer to a digital value, the voltage is computed in accordance with a product of the digital value and an impedance of said one of the reactance elements.

4. An output detecting voltage device for a laser oscillator including a high frequency power supply, transformer means, connected to the high frequency power supply, a matching circuit connected to the transformer means, the matching circuit including reactants elements connected in parallel and a load connected to the reactance elements, a laser tube connected to the matching circuit, amplifier means connected to the matching circuit and control means connected to the amplifier means, said output detecting voltage device comprising:
   current transformer means, connected to a ground terminal of one of the reactance elements connected to an output terminal of the matching circuit, and connected to the amplifier means, for detecting a current flowing in one of the reactance elements and detecting a voltage applied to the laser tube in accordance with the detected current.

5. An output voltage detecting device according to claim 4, wherein the reactance elements comprise capacitors and the load comprises an inductor.

6. An output voltage detecting device, comprising:
   a high frequency power supply for providing a high frequency power;
   transformer means, connected to said high frequency power supply, for boosting the high frequency power from said high frequency power supply to a required voltage;
   a matching circuit, connected to said transformer means, having an output terminal, for performing an impedance matching, said matching circuit including:
   reactance elements connected in parallel; and
   a load connected to said reactance elements;
   a laser tube, connected to said matching circuit, for receiving power from said high frequency power supply impedance matched by said matching circuit;
   current transformer means, connected to a ground terminal of one of said reactance elements connected to said output terminal of said matching circuit, for detecting a current flowing in said one of said reactance elements and detecting a voltage applied to said laser tube in accordance with the detected current;
   amplifier means, connected to said current transformer means, for outputting a signal defined by a current output from said current transformer and one of said reactance elements; and
   control means, connected to said amplifier means, for receiving the current from said current transformer means and converting the current to a digital value.

* * * * *

UNITED STATES PATENT AND TRADEMARK OFFICE
CERTIFICATE OF CORRECTION

PATENT NO. : 4,872,178
DATED : OCTOBER 3, 1989
INVENTOR(S) : AKIRA EGAWA

It is certified that error appears in the above-identified patent and that said Letters Patent is hereby corrected as shown below:

Col. 1, line 64, "a voltage" should be --circuit. A voltage--.

Col. 2, line 68, "topped" should be --stopped--.

Signed and Sealed this

Sixth Day of November, 1990

Attest:

HARRY F. MANBECK, JR.

*Attesting Officer*  *Commissioner of Patents and Trademarks*